Patented Apr. 16, 1935

1,998,102

UNITED STATES PATENT OFFICE 1,998,102

SECONDARY-AMYL ALLYL BARBITURIC ACID AND ITS SALTS

Horace A. Shonle, Indianapolis, Ind., assignor to Eli Lilly and Company, Indianapolis, Ind., a corporation of Indiana No Drawing. Application June 19, 1933, Serial No. 676,539. In Canada August 2, 1930

6 Claims. (Cl. 260—33)

This application is a continuation in part of my copending applications Serial Nos. 387,084 and 593,201, filed respectively on August 19, 1929, and February 15, 1932.

It is the object of my present invention to produce di-ethyl-carbinyl allyl barbituric acid, (also called allyl 1-ethyl-propyl barbituric acid), and its salts.

The new di-ethyl-carbinyl allyl barbituric acid and its salts have pronounced hypnotic action. They may all be represented by the following formula:

(1)
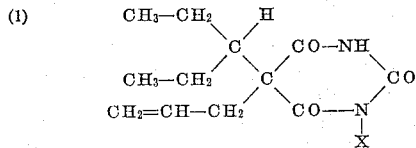

in which X represents either hydrogen (if the compound is an acid), or either an alkali metal, such as sodium, or the equivalent of an alkaline-earth metal, such as calcium, or ammonium, or a mono- or di-alkyl-substituted ammonium, such as —NH$_3$—CH$_3$ or —NH$_2$(C$_2$H$_5$)$_2$, (if the compound is a salt). Thus di-ethyl-carbinyl allyl barbituric acid has the formula:

(2)
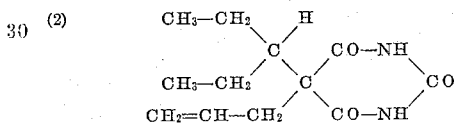

As I first prepared di-ethyl-carbinyl allyl barbituric acid, I obtained it mixed with isomers; although I did not then appreciate that such was the case. It was such mixture of this acid with isomers which is described as the acid itself in my aforesaid parent application Serial No. 387,084; and also in my other parent application Serial No. 593,201, which in this respect is a continuation of application Serial No. 387,084. That mixture undoubtedly contained this acid, but there was an isomeric barbituric acid co-present. Both of these acids are secondary-amyl allyl barbituric acids.

The isomerization which takes place occurs mainly in the preparation of the 3-bromo-pentane used in the preparation of di-ethyl-carbinyl allyl barbituric acid, when that 3-bromo-pentane is prepared by refluxing di-ethyl carbinol with aqueous hydrobromic acid. At the time of filing my parent application Serial No. 387,084, I did not appreciate that this isomerization might occur in disturbing amounts. But it was subsequently pointed out to me that even in rapidly distilling the di-ethyl carbinol with aqueous hydrobromic acid a tendency to rearrangement existed, to give an equilibrium mixture of 2-bromo-pentane and 3-bromo-pentane. This tendency to isomerize was pointed out and discussed in a paper by Shonle, Keltch, and Swanson, published June 6, 1930, in The Journal of the American Chemical Society, vol. 52, page 2440, particularly on pages 2442 and 2443; which discussed and described various barbituric acids and barbiturates, including di-ethyl-carbinyl allyl compounds in what is now known to be an isomer-containing state. But that paper did not describe these di-ethyl-carbinyl allyl compounds free from isomers.

I have been able to make, and have made, di-ethyl-carbinyl allyl barbituric acid, and the corresponding barbiturates, substantially free from isomers. While this may be done by using recrystallization procedures from the mixture which contains this acid with its isomers, I prefer to do it by preventing largely if not wholly the formation of the isomers; by forming 3-bromo-pentane substantially free from isomers. This may be done by using anhydrous gaseous hydrogen bromide in place of the aqueous hydrobromic acid which I previously used, in producing 3-bromo-pentane from di-ethyl carbinol. By thus obtaining the 3-bromo-pentane substantially free from its isomers, I am able to obtain therefrom relatively isomer-free di-ethyl-carbinyl allyl barbituric acid and di-ethyl-carbinyl allyl barbiturates.

My present application is directed to the di-ethyl-carbinyl allyl barbituric acid and barbiturates, whether they are in the state described in my aforesaid parent application Serial No. 387,084, where they have isomers co-present with them, or are substantially isomer-free.

In preparing my new product, I first prepare 3-bromo-pentane from di-ethyl carbinol. Then I prepare a mono-substituted di-ethyl-carbinyl malonic ester from the 3-bromo-pentane. Then I prepare the mono-substituted di-ethyl-carbinyl barbituric acid from the mono-substituted di-ethyl-carbinyl malonic ester, by causing the latter to react with urea in the presence of sodium ethylate. Then I allylate this mono-substituted di-ethyl-carbinyl barbituric acid, by causing it to react with allyl bromide in the presence of alkali, to produce the di-substituted di-ethyl-carbinyl allyl barbituric acid. Then, if desired, I may prepare barbiturates from this di-substituted di-ethyl-carbinyl allyl barbituric acid, by reaction with a suitable base.

3-Bromo-pentane

The 3-bromo-pentane is obtained by treating di-ethyl carbinol with HBr. The HBr may be either aqueous hydrobromic acid, or anhydrous gaseous hydrogen bromide. If aqueous hydrobromic acid is used, it is refluxed with the di-ethyl carbinol; and yields 3-bromo-pentane which has co-present with it a variable amount of its isomer, 2-bromo-pentane, because of the isomerization which occurs in the reaction. On the other hand, if anhydrous gaseous hydrogen bromide is passed into the di-ethyl carbinol at low temperature, the 3-bromo-pentane obtained is substantially if not wholly free from isomers. This substantially pure 3-bromo-pentane and the method of making it have already been described in the literature.

Mono-substituted malonic esters

Mono-substituted malonic esters may be prepared from this 3-bromo-pentane by causing it to react with the desired un-substituted malonic ester. The malonic ester which I produce and use is desirably the ethyl ester, or di-ethyl malonate as it is also called. Therefore, although the methyl ester (di-methyl malonate) or the propyl ester (di-propyl malonate) can be produced and used by my method, I use the term "malonic ester" herein to denote the di-ethyl malonate, save where otherwise indicated. Thus by "di-ethyl-carbinyl malonic ester", which I use in preparing my di-ethyl-carbinyl barbituric acid, I mean the mono-substituted di-ethyl malonate in which one of the methylene hydrogens has been replaced by the di-ethyl-carbinyl group.

Di-ethyl-carbinyl malonic ester

Di-ethyl-carbinyl malonic ester may be prepared from the 3-bromo-pentane as follows:

1 mole of sodium is dissolved in 10 or 12 times its weight of absolute alcohol under a reflux condenser. 1 mole of malonic ester is added; and then a large part of the alcohol is desirably removed by vacuum distillation from the resultant product. Then slightly more than 1 mole, desirably about 1.1 moles, of 3-bromo-pentane are added gradually, and the mixture is then refluxed for some hours, or until it no longer shows an alkaline reaction to moist litmus paper. Then the alcohol which still remains, or most of it, is removed by vacuum distillation, leaving an oily residue. Water is added to this residue to dissolve out the sodium bromide; and the oily layer, which is crude di-ethyl-carbinyl malonic ester, is separated and dried. It is purified by fractional distillation in vacuo. When so purified, it is a colorless or pale yellow liquid.

The 3-bromo-pentane used may be either in the form which has its 2-bromo-pentane isomer co-present with it, or in the form in which it is substantially free from that isomer. If the former, the di-ethyl-carbinyl malonic ester obtained has co-present with it some propyl-methyl-carbinyl malonic ester, to form a mixture of isomers which has a boiling point of 100°–103° C. at about 3 mm. pressure, and a refractive index at 25° C. of between 1.4256 and 1.4266. If the 3-bromo-pentane used to make the malonic ester is substantially free from isomers, however, the di-ethyl-carbinyl malonic ester obtained is also relatively free from isomers (although some isomerization occurs in making it); in which case it has a boiling point of 86°–90° C., corrected, at about 2 mm. pressure, and a refractive index at 25° C. of between 1.4276 and 1.4282.

The di-ethyl-carbinyl malonic ester obtained may be represented by the following formula:

(3) 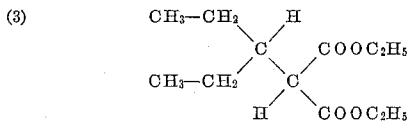

Its isomer, propyl-methyl-carbinyl malonic ester, which may be co-present with it, especially if the hydrogen bromide used to react with the di-ethyl-carbinol was in the form of aqueous hydrobromic acid, may be represented by the following formula:

(4) 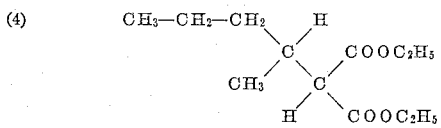

Di-ethyl-carbinyl barbituric acid

Di-ethyl-carbinyl barbituric acid (also called 1-ethyl-propyl barbituric acid) may be prepared from di-ethyl-carbinyl malonic ester as follows:

3 moles of sodium are dissolved in 10 to 12 times its weight of absolute alcohol under a reflux condenser. To this are added 1.6 moles of urea and 1 mole of di-ethyl-carbinyl malonic ester. The mixture is gently refluxed for two to four hours, after which most of the alcohol is removed by vacuum distillation. The residue is dissolved in water, and a sufficient amount of dilute acid is added to completely precipitate the di-ethyl-carbinyl barbituric acid. The precipitate is filtered off, dried, washed in gasoline, and purified by repeated recrystallizing from dilute alcohol.

If the malonic ester used is one prepared from 3-bromo-pentane which had its isomer 2-bromo-pentane co-present with it, the resultant di-ethyl-carbinyl barbituric acid has co-present with it a considerable amount of its isomer propyl-methyl-carbinyl barbituric acid. In that case, after a few recrystallizations from dilute alcohol, it usually exhibited a melting point of about 165°–168° C., corrected; although this varies somewhat with the degree of isomerization which has occurred and with the purification obtained by recrystallization. It was this material with a melting point of about 165°–168° C. that is described in my aforesaid parent applications as di-ethyl-carbinyl barbituric acid. However, by further repeated recrystallizations from dilute alcohol, it is possible to obtain from this material which melted at 165°–168° C. a barbituric acid which has a melting point of 195.5°–197.5° C., corrected. Thus the di-ethyl-carbinyl barbituric acid which is described in such parent applications was actually a mixture of that barbituric acid with some propyl-methyl-carbinyl barbituric acid.

On the other hand, if the malonic ester used is one prepared from 3-bromo-pentane which is substantially free from its isomer 2-bromo-pentane, then the di-ethyl-carbinyl barbituric acid obtained has relatively little propyl-methyl-carbinyl barbituric acid co-present with it; and by a relatively few recrystallizations from dilute alcohol it may be obtained in a substantially isomer-free state, in which it has a substantially constant melting point of 195.5°–197.5° C., corrected.

German Patent No. 293,163 describes, under Example 5, a mono-substituted di-ethyl-carbinyl barbituric acid as having a melting point of 198° C.

The di-ethyl-carbinyl barbituric acid obtained, whether or not its isomer propyl-methyl-carbinyl barbituric acid is co-present, is a white crystalline solid. It is soluble in alcohol and ether, and insoluble in petroleum ether. It dissolves in aqueous solutions of the hydroxides of the alkali metals. Its potassium and sodium salts are both white solids, readily soluble in water, and insoluble in ether. It may be represented by the following formula:

(5) 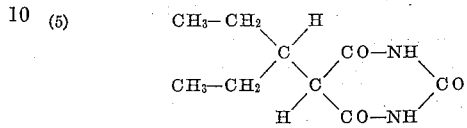

Its isomer methyl-propyl-carbinyl barbituric acid may be represented by the following formula:

(6) 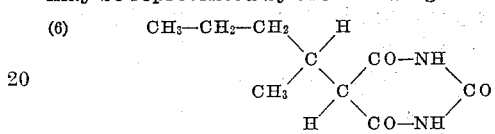

*Di-ethyl-carbinyl allyl barbituric acid*

Di-ethyl-carbinyl allyl barbituric acid (also called allyl 1-ethyl-propyl barbituric acid) may be prepared by allylating di-ethyl-carbinyl barbituric acid. One method of doing this is as follows:

1 mole of di-ethyl-carbinyl barbituric acid is dissolved in a 10% to 35% aqueous solution of 1 mole of potassium hydroxide. To this are added somewhat in excess of 1 mole of allyl bromide, and alcohol equal to about 10% of the total volume of the solution. This is agitated for a number of hours. At the end of this time, the solution is concentrated to about one-half its volume, to remove the excess allyl bromide and the alcohol. On cooling, an oily layer, which is di-ethyl-carbinyl allyl barbituric acid, separates out as a sticky viscous mass. It is dried, washed with petroleum ether, and dissolved in the minimum amount of benzene. Any unreacted di-ethyl-carbinyl barbituric acid, which does not dissolve, is filtered off. The addition of petroleum ether to the clear filtrate causes the di-ethyl-carbinyl allyl barbituric acid to precipitate, usually as a wax-like mass. This is separated, washed with petroleum ether, and dried in vacuo. After some time it hardens into a whitish solid. It is a difficultly crystallizable material if it is prepared from a mono-substituted di-ethyl-carbinyl barbituric acid which contained a considerable quantity of isomers. If the mono-substituted di-ethyl-carbinyl barbituric acid used in preparing the di-substituted di-ethyl-carbinyl allyl barbituric acid is substantially isomer-free, however, with a melting point of 195.5°–197.5° C., the di-ethyl-carbinyl allyl barbituric acid may be more readily obtained as a crystalline solid, and from this it is possible by a few recrystallizations to obtain it with a melting point of 130°–132° C., corrected. Di-ethyl-carbinyl allyl barbituric acid is represented by Formula 2 which has already been given. Its isomer propyl-methyl-carbinyl allyl barbituric acid, which may be co-present with it if the intermediates leading to its production were not isomer-free, may be represented by the following formula:

(7) 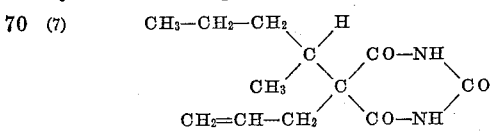

These two isomers are very similar in their pharmacologic properties. Both are effective hypnotics. In consequence it is possible to obtain good hypnosis with either alone or with a mixture of the two.

The preferred method of obtaining the pure salts is described hereinafter.

*Barbiturates*

Di-ethyl-carbinyl allyl barbituric acid, whether in substantially pure form with a melting point of 130°–132° C. or in the form of a mixture with some of its isomer propyl-methyl-carbinyl allyl barbituric acid co-present with it, is soluble in solutions of alkali-metal hydroxides and ethylates, to form the corresponding alkali-metal barbiturates in solution.

These and certain other barbiturates contemplated in this application may all be represented by Formula 1, with X representing a metal, or ammonium, or an alkyl-substituted ammonium; and can best be prepared from the recrystallized barbituric acid, as by reaction in a suitable solvent with either the hydroxide or the ethylate of the desired inorganic base, or with ammonia, or with the desired alkyl amine. They are effective hypnotics.

*Alkali-metal salts.*—A solution of 1 molar proportion of the hydroxide or the ethylate of the inorganic base, such as sodium if an alkali-metal salt is desired, is added to a suspension or solution in a suitable solvent, alcohol for instance, of 1 molar proportion of the herein-contemplated di-ethyl-carbinyl allyl barbituric acid, to produce the desired sodium barbiturate in solution. The amount of solvent used is desirably sufficient to dissolve the salt thus produced. The solution is filtered; and is then evaporated, preferably under vacuo at low temperature, until the salt is obtained in solid form. If the salt is desired in a stable form sufficiently free from contaminants so that clear-water solutions suitable for intravenous injection may be obtained, it may be obtained by the method set forth in my Patent No. 1,856,792, granted May 3, 1932.

Sodium di-ethyl-carbinyl allyl barbiturate may be represented by the following formula:

(8) 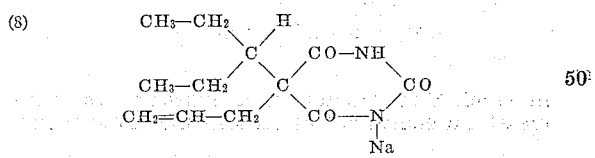

It is a white solid, readily soluble in water and alcohol, and insoluble in ether. The salt is bitter tasting, and its aqueous solution is alkaline in reaction. The aqueous solution of this salt is not stable, but decomposes on standing.

If this salt is prepared from the di-ethyl-carbinyl allyl barbituric acid which melts at 130°–132° C. it is substantially free from isomers; but if it is prepared from the acid in which the isomer is co-present, a corresponding amount of the isomeric salt is present in the salt obtained. This isomeric salt is sodium propyl-methyl-carbinyl allyl barbiturate, and may be represented by the following formula:

(9) 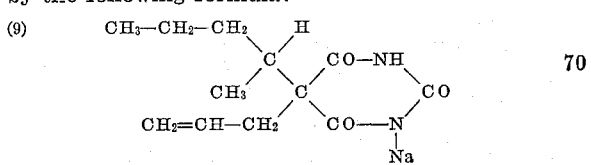

*Ammonium salt.*—1 molar proportion of diethyl-carbinyl allyl barbituric acid may be dissolved in or added to more than a molar proportion of concentrated aqueous ammonia solution, and the resultant ammonium salt crystallizes out or is concentrated to solid form. The formula of this ammonium salt corresponds in general to Formula 8, for the sodium salt, save that NH4 is substituted for Na.

*Alkyl-substituted-ammonium salts.*—1 molar proportion of di-ethyl-carbinyl allyl barbituric acid is added to somewhat more than a molar proportion of the desired organic base, such as mono- or di-methyl amine or mono- or di-ethyl amine, in aqueous or alcoholic solutions if desired or necessary. The amount of liquid used should be sufficient to ensure complete reaction. The resulting organic-base barbiturate crystallizes out or is concentrated to solid form. The formulas of such organic-base barbiturates correspond in general to Formula 8, for the sodium salt, save that the substituted-ammonium radical, such for instance as the methyl-ammonium radical —NH3—CH2 or the di-ethyl-ammonium radical —NH2(C2H5)2, takes the place of Na.

I claim as my invention:

1. A secondary-amyl allyl barbituric substance derived from di-ethyl carbinol and having hypnotic properties, and including a compound which is represented by the following formula:

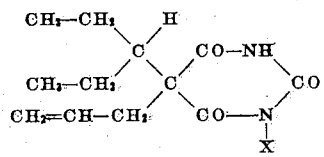

in which X represents either hydrogen, an alkali metal, an equivalent of an alkaline-earth metal, ammonium, or a mono- or di-alkyl-substituted ammonium.

2. A di-ethyl-carbinyl allyl barbituric compound which is represented by the following formula:

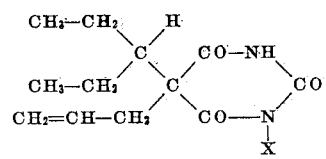

in which X represents either hydrogen, an alkali metal, an equivalent of an alkaline-earth metal, ammonium, or a mono- or di-alkyl-substituted ammonium; which substance when X represents hydrogen is a barbituric acid which has a melting point of 130°–132° C., and when X represents any of the other things named is a salt of that barbituric acid.

3. A secondary-amyl allyl barbituric acid derived from di-ethyl carbinol and having hypnotic properties, and including a barbituric acid which is represented by the following formula:

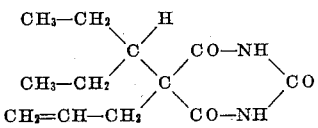

4. A di-ethyl-carbinyl allyl barbituric acid which is represented by the following formula:

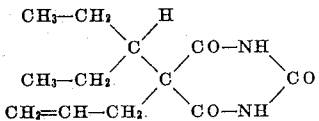

which substance has a melting point of 130°–132° C.

5. A sodium secondary-amyl allyl barbiturate derived from di-ethyl carbinol and having hypnotic properties, and including a barbiturate which is represented by the following formula:

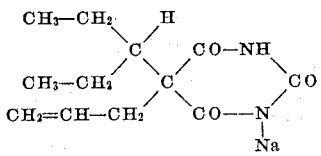

which barbiturate is the sodium salt of the barbituric acid defined in claim 3.

6. A sodium di-ethyl-carbinyl allyl barbiturate, which is represented by the following formula:

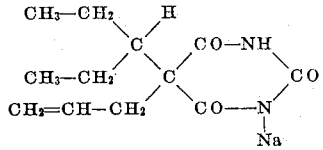

which barbiturate is the sodium salt of a di-ethyl-carbinyl allyl barbituric acid which has a melting point of 130°–132° C.

HORACE A. SHONLE.